July 2, 1929. T. E. JONNSON 1,719,768
CHICK PROTECTOR
Filed June 6, 1927
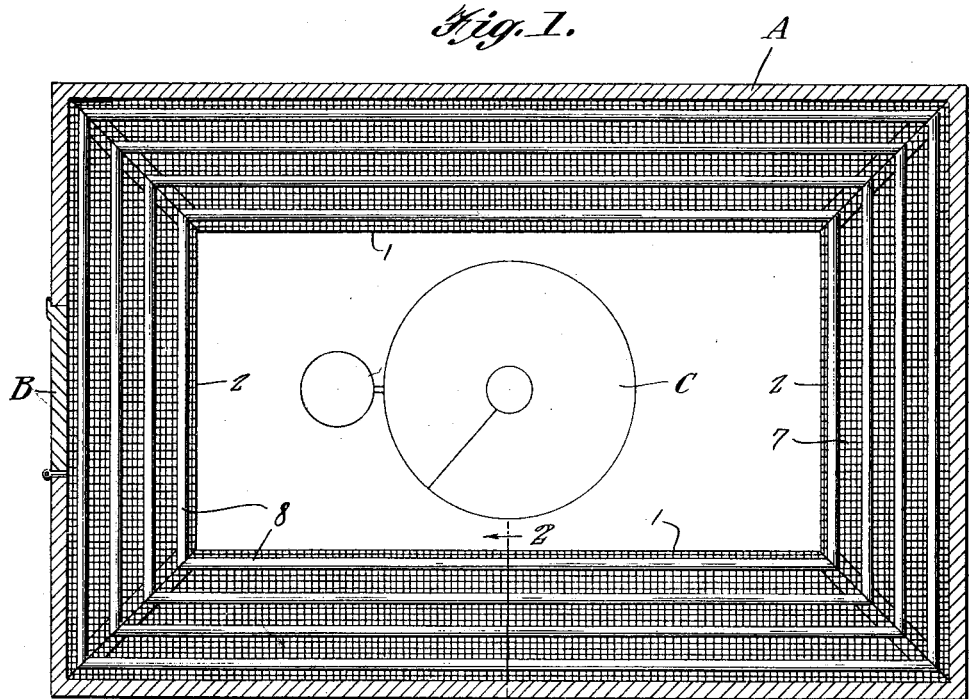
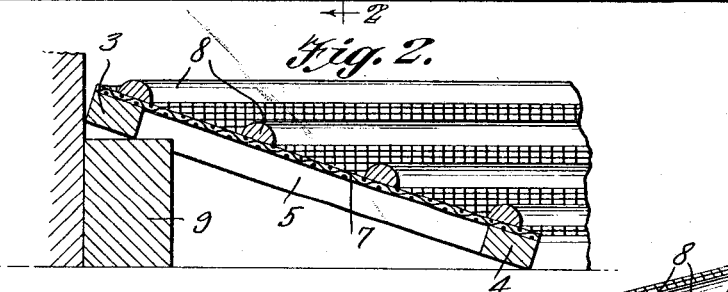
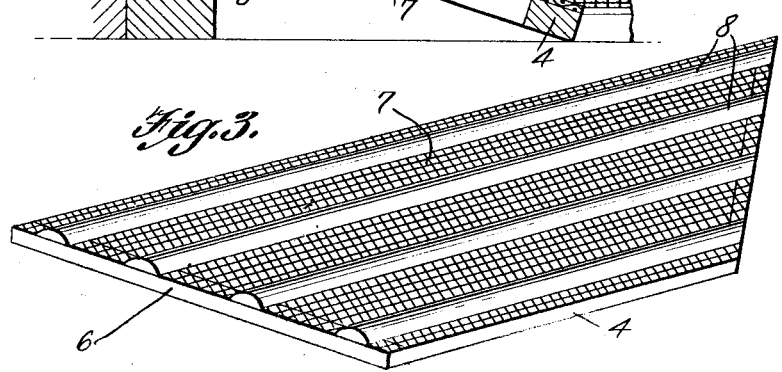
Thomas E. Johnson,
INVENTOR
BY Victor J. Evans
ATTORNEY
WITNESS: P. T. Hickey Patented July 2, 1929.

1,719,768

UNITED STATES PATENT OFFICE.

THOMAS E. JOHNSON, OF TOLEDO, IOWA.

CHICK PROTECTOR.

Application filed June 6, 1927. Serial No. 196,893.

This invention relates to confining and housing devices for poultry and its general object is to provide a chick protector, that not only prevents chicks from crowding which results in smothering, but also has a tendency to make them perch so that smothering is impossible.

A further object of the invention is to provide a chick protector that is constructed to provide proper ventilation and can be arranged in a coop and the like in a manner to be disposed about a brooder with the result, that the chicks will be kept in a warm and healthy condition.

Another object of the invention is to provide a chick protector that is simple in construction and extremely inexpensive to manufacture.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a horizontal sectional view taken through a coop or the like and showing my protector in operative position about a brooder.

Figure 2 is a sectional view taken approximately on line 2—2 of Figure 1 looking in the direction of the arrows.

Figure 3 is a perspective view of one of the sections of my protector.

Referring to the drawings in detail the letter A indicates a coop or the like which is provided with the usual hinged door B.

The device which forms the subject matter of the present invention is adapted to be constructed so as to be arranged in the coop A about a brooder C as shown in Figure 1 and includes sections which in the present instance may be termed side sections 1 and end sections 2. While I have illustrated the device as being rectangular in formation, it will be obvious that it can be made square or any other desired shape.

Each section of the device is of similar construction and includes parallel strips 3 and 4 which are suitably braced midway their ends by a cross strip 5. The ends 6 of each section are arranged at an inclination and adapted to be disposed in contacting engagement as best shown in Figure 1 to provide the enclosure as suggested.

The strips and ends have secured thereto wire mesh 7 which is preferably provided with one inch interstices for a purpose which will be presently apparent.

Fixed to the strips and overlying the wire are perches 8 which are arranged in parallelism on each section and have their ends following the inclination of the ends 6 so that the ends of the perches will likewise be arranged in contacting engagement and provide a continuous perch as suggested.

The sections are supported at a converging inclination through the instrumentality of blocks 9 which are disposed at the respective outer corners of the sections as well as midway their ends as suggested in Figure 2 of the drawings.

From the above description and disclosure of the drawings, it will be obvious that I have provided a device which may be easily and readily supported in a coop or the like about a brooder and by arranging the sections of the device at an inclination, the chicks will be provided with proper ventilation, yet will be kept in a warm condition by the heat of the brooder C. The wire mesh performs a dual function, namely it allows proper ventilation as well as has a tendency to make the chicks stand or roost upon the perches 8, with the result smothering of the chicks is practically impossible as it is well known that chicks have a tendency to gather in numbers in corners and along the sides of a housing, but the wire will prevent them from doing so in the use of my device because it will hurt their feet, therefore the chicks will roost upon the perches as above set forth.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A device of the character described comprising sections including parallel strips, inclined end strips secured to said parallel strips, said sections being adapted to be arranged with the inclined end strips in contacting engagement so as to form an enclosure, a cross strip for each section for reinforcing the same, wire mesh secured to said strips and having interstices of a size to prevent chicks from roosting thereon, blocks for supporting said sections in converging relation with respect to each other and perches fixed to the strips and overlying the wire, said perches having their ends formed to follow the inclination of the end strips and being disposed in engagement with the ends of perches of adjacent sections to provide continuous perches.

In testimony whereof I affix my signature.

THOMAS E. JOHNSON.